USOO5819225A

United States Patent [19]

Eastwood et al.

[11] Patent Number: 5,819,225
[45] Date of Patent: Oct. 6, 1998

[54] DISPLAY INDICATIONS OF SPEECH PROCESSING STATES IN SPEECH RECOGNITION SYSTEM

[75] Inventors: Peter Rowland Eastwood, Salem, Utah; Alan J. Happ, Lake Worth, Fla.; Alice G. Klein, Potomac; Daniel William Kruse, Germantown, both of Md.; Maria Milenkovic, Boca Raton, Fla.

[73] Assignee: International Business Machines Corporation, Armonk, N.Y.

[21] Appl. No.: 655,541

[22] Filed: May 30, 1996

[51] Int. Cl.⁶ ........................................ G10L 7/08
[52] U.S. Cl. ........................ 704/275; 704/270; 345/326
[58] Field of Search ...................... 704/270, 275; 395/155, 159, 161; 345/326, 348

[56] References Cited

U.S. PATENT DOCUMENTS

| | | |
|---|---|---|
| 5,113,481 | 5/1992 | Smallwood et al. . |
| 5,202,952 | 4/1993 | Gillick et al. . |
| 5,208,745 | 5/1993 | Quentin et al. ........................ 364/188 |
| 5,374,924 | 12/1994 | McKiel . |
| 5,386,494 | 1/1995 | White ...................... 395/2.84 |
| 5,461,710 | 10/1995 | Bloomfield et al. . |
| 5,469,540 | 11/1995 | Powers, III et al. ................... 395/158 |
| 5,473,745 | 12/1995 | Berry et al. . |
| 5,487,143 | 1/1996 | Southgate . |
| 5,491,795 | 2/1996 | Beaudet et al. ........................ 395/159 |
| 5,534,887 | 7/1996 | Bates et al. .............................. 345/120 |
| 5,544,305 | 8/1996 | Ohmaye et al. ........................ 395/161 |
| 5,617,526 | 4/1997 | Oran et al. ................................ 395/326 |
| 5,664,061 | 9/1997 | Andreshak et al. ..................... 704/275 |
| 5,692,040 | 11/1997 | Greenblatt .............................. 379/350 |

OTHER PUBLICATIONS

IBM TDB Sep. 1994 vol. 37 No. 9, p. 385: Icon Color Match To Show State Of Object Represented By Icon.
IBM TDB Apr. 1994 vol. 37 No. 04A, p. 575: Method For Query Of Desktop Object With No Side–Effect Navigation.
IBM TDB Apr. 1994 vol. 37 No. 04A, pp. 669–670: Method For Associating Help With Host Application Functions.
IBM TDB Oct. 1995 vol. 37 No. 05, pp. 93–94: Dynamic Title Bar Update For New Mail Notification.

*Primary Examiner*—David R. Hudspeth
*Assistant Examiner*—Michael N. Opsanick
*Attorney, Agent, or Firm*—Richard A. Tomlin; Robert Lieber

[57] ABSTRACT

A visual feedback aid, for a computer system performing speech recognition functions, provides indications on a display monitor of the system representing the current state of operation of a system microphone, the current mode of operation of the system in respect to speech, and a string of text representing the system's recognition (correct or incorrect) of commands instantly spoken into the microphone. The indications preferably are located in a reserved area of a display window associated with a currently active application involving speech recognition. The reserved area preferably would be a prominent one, such as the application title bar.

15 Claims, 3 Drawing Sheets

| HUMAN CENTER HELP |

FILE EDIT BOOKMARK OPTIONS HELP

CONTENTS | SEARCH | BACK | PRINT | GLOSSARY | FIND

SPEECH MODES
YOU CAN TALK TO YOUR COMPUTER IN 3 WAYS: THROUGH
NAVIGATION MODE, CONVERSATION MODE, AND DICTATION MODE.

TO USE NAVIGATION MODE:

1. SAY ANY OF THE COMMAND PHRASES FOUND IN THE WHAT CAN I SAY? WINDOW. (TO DISPLAY THIS WINDOW, SAY "WHAT CAN I SAY?") THE COMPUTER RESPONDS "PARDON ME?" IF IT DID NOT UNDERSTAND YOUR COMMAND. THE SPEECH-MODE ICON NEAR THE LEFT CORNER OF THE TITLE BAR BECOMES A NAVIGATION ICON.

2. SAY "GO TO SLEEP" TO SUSPEND NAVIGATION MODE. (THIS IS USEFUL WHEN YOU ARE TALKING ON THE PHONE OR WITH YOUR CO-WORKERS.)

3. SAY "WAKE UP" TO RESUME NAVIGATION.

SEE ALSO:
WHAT CAN I SAY? CONTENTS

TO USE CONVERSATION MODE:

1. SAY "<ASSISTANT NAME>" TO GET YOUR ASSISTANT'S ATTENTION AND ENTER CONVERSATION MODE. THE ASSISTANT RESPONDS "YES" OR "EXCUSE ME?" IF IT DID NOT UNDERSTAND YOUR COMMAND. THE SPEECH-MODE ICON NEAR THE LEFT CORNER OF THE TITLE BAR BECOMES AN ASSISTANT/AGENT ICON.

2. TELL YOUR ASSISTANT WHAT YOU WANT. (SAY "WHAT CAN I SAY?" TO SEE EXAMPLES OF VOICE COMMANDS YOU CAN SAY TO YOUR ASSISTANT.)

3. SAY "THANK YOU" TO LEAVE CONVERSATION MODE AND ENTER NAVIGATION MODE, OR SAY "GO TO SLEEP" TO SUSPEND CONVERSATION MODE. (THIS IS USEFUL WHEN YOU ARE TALKING ON THE PHONE OR WITH YOUR CO-WORKERS.)

4. SAY "<ASSISTANT NAME>" OR "WAKE UP" TO RESUME CONVERSATION MODE.

FIG. 2

DISPLAY INDICATIONS OF SPEECH PROCESSING STATES IN SPEECH RECOGNITION SYSTEM

FIELD OF THE INVENTION

This invention relates to computer systems adapted for speech recognition, and particularly to an arrangement in such systems for displaying the instantaneous status of speech recognition functions.

BACKGROUND OF THE INVENTION

In computer systems adapted for speech recognition, recognition of spoken commands represents a new and exciting way for end users to interact with the system. However, such interaction presents some new problems/ design challenges.

For example, in systems having graphical user interfaces, users need to know which window (e.g. currently active/ open application) will respond to a voice command. Furthermore, since speech recognition systems are not 100% accurate at all times, users require immediate and pertinent feedback as to whether or not the system heard what is said and whether or not spoken commands have been correctly recognized.

These problems are addressed by the present invention.

SUMMARY OF THE INVENTION

In accordance with the invention, users of systems responsive to spoken commands are presented with a unique set of visual cues providing the necessary feedback.

In a preferred embodiment, pertaining to a system having a graphic user interface and speech recognition capabilities, display windows associated with applications subject to speech recognition have a specific area reserved for presentation of the foregoing feedback cues. Although not essential to this invention, it is considered desirable to have this reserved area be located in the application title bar.

Specific visual cues presently contemplated include: a) a first set of variably presented icons indicating the state of a system microphone that detects speech; b) a second set of variably presented icons indicating system operating modes in respect to speech recognition; and c) a string of text indicating the system's recognition of what has been said (e.g. to enable a system user to determine if his/her last command was correctly recognized).

Specific microphone states indicated by the first set of icons may include:

Microphone Off: e.g. showing a microphone in a horizontal position with gray background color.

Microphone On: e.g. showing a microphone in a diagonal orientation, with e.g. a green background.

Listening: a short transitory state used to indicate reception of a voice command, and showing e.g. a slightly enlarged microphone, with e.g. a green background.

Busy: indicating that the computer system is currently unavailable for speech processing, and showing e.g. an "hour glass" symbol with e.g. a yellow background.

Sleeping: indicating that the speech recognition application using the microphone is currently unavailable for processing speech, and shown e.g. by a horizontal microphone with a yellow background.

Specific speech recognition modes of the application currently processing speech may include:

Navigation (or Command and Control) Mode: in which the application is currently operative to move around the "desktop" in response to voice commands.

Conversation Mode: in which the application converts text into natural sounding speech.

Dictation Mode: in which the application converts speech (discrete or continuous) into text stored in a printable/ character displayable form.

The foregoing and other features, aspects, benefits and advantages of our invention will be more fully understood by considering the following drawings and detailed description.

BRIEF DESCRIPTION OF THE DRAWINGS

FIG. 2 is a view of a Help screen table explaining how present icons indicative of "Navigator" and "Conversation" modes are used.

DETAILED DESCRIPTION

The present invention is particularly applicable to computer systems having graphical user interfaces; e.g. to systems in which users interact directly with open/active windows.

To indicate speech focus in such systems, the present invention provides visual feedback cues in windows pertaining to applications involving speech recognition. In accordance with the invention, these cues include: a) a first set of variably presented icons providing microphone state indications; b) a second set of variably presented icons providing speech mode indications (indications of system operating modes in respect to speech received at a microphone); and display of "recognized text" consisting of a string of printed text characters and words representing spoken terms that the system has just recognized or misrecognized. These indications are specifically described next.

Microphone State Indicators

Figure 1:
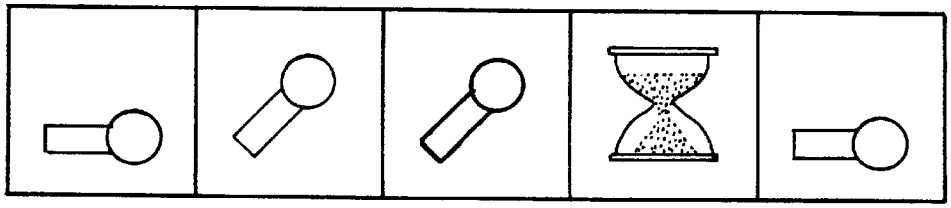
FIG. 1 illustrates presently used icons for indicating microphone status.

These are a number (presently five) of small "buttons" overlying the system menu within the Title Bar space. Their appearances are suggested in FIG. 1. Viewed from left to right in FIG. 1 these buttons have the following significance (when selected by e.g. mouse, keyboard or voice command):

Microphone Off: shows a microphone, in a horizontal position, with e.g. gray background color.

Microphone On: shows a microphone in a diagonal orientation, with e.g. green background, to represent that the microphone is ready to accept voice input. When the user says anything, the microphone goes to the Listening state described next. If the user says "Microphone Off", or clicks a pointer (e.g. mouse pointer) on the Microphone button, the microphone goes into its Off State. If the user says "Go to Sleep", the microphone goes into its Sleep State.

Listening: used to indicate that the speech processing function ("Navigator") that reacts to spoken commands (see Navigation Mode below) is currently listening to a command (this is a short transitory indication coinciding with the spoken command), and shown e.g. as a slightly enlarged microphone, with e.g. a green background.

Busy: indicating that the Navigator function is currently unavailable because of a busy state of the computer system, and shown e.g. as a "hour glass" symbol with e.g. a yellow background. In other operating environments, this could be a clock symbol.

Sleeping: indicating that the Navigator function is currently unavailable; and shown e.g. as a microphone in a horizontal position suggestive of "sleeping". The user can activate the sleeping Navigator by saying "Wake Up" into the microphone.

Speech Mode Indicators

Figure 3:
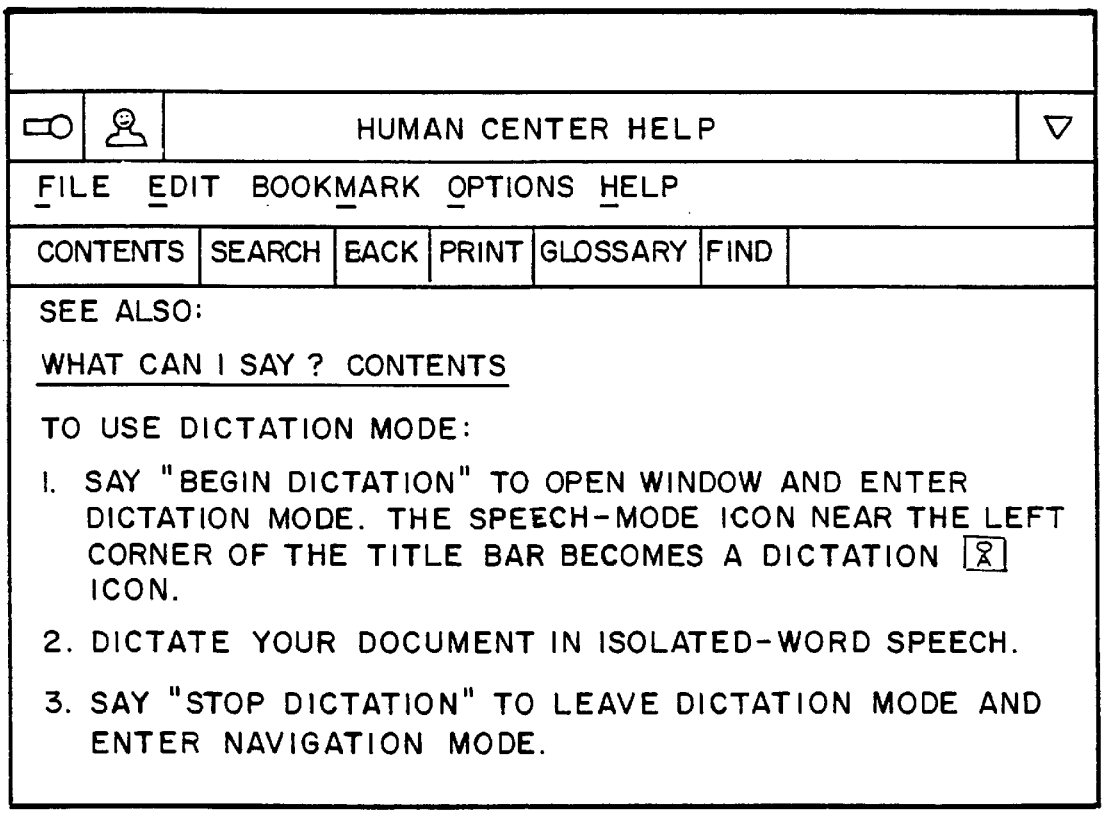
FIG. 3 is a view of a Help screen table explaining how an icon presently indicative of "Dictation" mode is used.

A speech processing application in accordance with the invention has a number of distinct operating modes. In the present embodiment, there are three such modes termed: Navigation mode, Conversation mode, and Dictation mode. Help screens describing these modes are reproduced in FIGS. 2 and 3. These modes function as follows:

Navigation (or Command and Control) mode: the application is currently operative to interpret and execute spoken commands; e.g. to move around the "desktop", or through or between applications or objects, in response to voice commands or within an application once selected.

Conversation Mode: this allows the user to "speak" to a virtual assistant that responds to user remarks or inquiries with natural sounding speech that is derived by converting text (pre-stored in a printable/character displayable form) into such speech.

Dictation Mode: used for creating documents, converts user speech into text (stored in a printable/character displayable form).

Recognized Text

Figure 4:
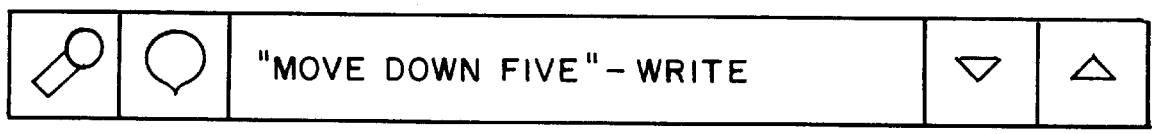
FIG. 4 is a view of a text string representing what the application and system have interpreted as words instantaneously spoken by a user.

Recognized, or even misrecognized, immediate voice input is displayed next to the other indicators (microphone and mode) as a text string (FIG. 4). The text string is surrounded by double quotes to maintain the metaphor of conversation with the system. When the voice recognition system is unsure of what the user has said, it displays a e.g. "Pardon me?" message.

Location of Indicators

All of the above indicators are preferably located in a prominent portion of an "active" window currently having the speech focus. A suitable location would be the title bar of the window Voice Toolbar (Voice Center).

Forms of Implementation

Those skilled in the relevant arts will recognize that the present invention may be embodied in a number of different forms; e.g. hardware, software, or a combination thereof. They also will recognize that when embodied in software, the invention may be deliverable to computer systems through computer-readable media such as: hard disks, diskettes, CD-ROM disks, communication networks, etc.

Accordingly, we claim:

1. In a computer system adapted for speech recognition, said system having a speech transducer and display monitor attached thereto, said system having n (>2) different modes of speech recognition usage, said transducer having m (>2) different states of operation associated with individual said modes of usage, and said display monitor being adapted by said system to display windows pertaining to program applications currently active in said system, each said window having an area reserved for displaying information pertinent to speech recognition functions currently being performed in said system, display apparatus comprising:

means for adapting said monitor, while a said window is being used relative to a program application and while said system is instantaneously operating in one of said n speech recognition modes relative to said program application, to display first and second symbols in said reserved area of said window; said first symbol uniquely reflecting said instantaneous speech recognition mode of said system, and said second symbol uniquely reflecting the instantaneous state of operation of said speech transducer relative to said program application; said first symbol constituting a unique one of n mode indicating symbols corresponding to said n speech recognition modes of said system; and said second symbol constituting a unique one of m state indicating symbols associated with said m states of operation of said speech transducer; and means responsive to commands spoken by a user of said system for selectively varying said displayed first and second symbols, as said system varies its speech recognition mode of operation and as the operating state of said speech transducer is varied, in order to maintain correspondence between said indicated first and second symbols and instantaneous speech recognition modes and speech transducer states pertaining to the program application in said window.

2. Display apparatus in accordance with claim 1 wherein individual said windows contain a title bar and said reserved area in which said first and second symbols are displayed is in said title bar in the respective window.

3. Display apparatus in accordance with claim 1 wherein said speech transducer is a microphone, and wherein said displayed second symbol is:

a unique one of m icons for indicating states of operation of said microphone.

4. Display apparatus in accordance with claim 3 wherein said m microphone state icons include two icons for respectively indicating on and off states of said microphone.

5. Display apparatus in accordance with claim 3 wherein said m microphone state icons include at least 3 icons having the appearance of a microphone and a $4^{th}$ icon indicative of a "busy" state of operation of said system relative to said microphone; each said symbol having the appearance of a microphone having one of the following orientations: horizontal, vertical and diagonal; said symbols having the appearance of a microphone including symbols individually indicating the following microphone states: an Off state in which the microphone is disabled, an On state in which the microphone is enabled, a Listening state indicating that the microphone is instantaneously receiving voice input; and a sleeping state indicating that the microphone is instantaneously but the speech recognition function of the unavailable; said $4^{th}$ icon indicative of said busy state having the appearance of an hourglass and being displayed while said computer system is busy and therefore unavailable to handle speech recognition functions.

6. Display apparatus in accordance with claim 3 wherein said first symbol is an icon depicting the instantaneous mode of usage of said system in respect to speech recognition.

7. Display apparatus in accordance with claim 6 wherein said first symbol is an icon indicating a unique one of the following speech recognition modes:

a navigation mode in which a user of said system can control operations of said system using spoken commands;

a conversation mode in which said user can effectively converse with a program application in said system and thereby for instance receive helpful instructions from said application; and a dictation mode in which said system operates to convert speech of a said user into displayed alphanumeric characters representing printable text.

8. Display apparatus in accordance with claim 7 wherein said icon indicating said navigation mode is displayed in conjunction with a string of alphanumeric characters representing a command recognized by said system as having been spoken by a said user of said system; said string of displayed characters allowing a user of said system to verify that a command just spoken by said user has been correctly recognized by said system.

9. A computer program product for providing visual feedback during interaction between a computer system and a speaking user of said system, said user communicating with said system by speaking into a microphone, said system having n (>2) different modes of speech recognition usage and a graphic user interface displaying windows to said user, said microphone having m (>2) different operating states relative to said system, said product being deliverable on computer-readable media and comprising:

means for instructing said computer system to create a display window having a specific area reserved for providing visual feedback cues to said user; and means for further instructing said computer system to selectively display visual feedback cues in said reserved area, said cues specifically reflecting both the instantaneous mode of speech recognition usage of said system and the instantaneous state of operation of said microphone, and also indicating strings of text representing system recognition of terms instantly spoken into said microphone by said user.

10. A computer program product in accordance with claim 9 wherein said reserved area is in a portion of a title bar shown in said window.

11. A computer program product in accordance with claim 9 wherein said cues reflecting instantaneous states of said microphone are icons pictorially representing respective microphone states.

12. A computer program product in accordance with claim 11 wherein said icons pictorially representing said instantaneous microphone states are displayed against a highlighted background having a predetermined color.

13. A computer program product in accordance with claim 11 wherein said icons representing said instantaneous microphone states consist of a plurality of symbols having the appearance of a microphone and another symbol having the appearance of an hourglass; each of said symbols when highlighted having a selected background of a predetermined color; said plurality of symbols having the appearance of a microphone each depicting a microphone having one of the following orientations: horizontal, vertical and diagonal; said plurality of symbols having the appearance of a microphone including symbols individually defining the following microphone states: an Off state in which the microphone is disabled, an On state in which the microphone is enabled, a Listening state while the microphone is actively transducing speech, and a sleeping state used to indicate that the microphone is currently unavailable; said another symbol having the appearance of an hourglass serving to indicate a Busy state in which the computer system is busy and therefore unavailable to handle speech recognition functions.

14. A computer program product in accordance with claim 9 wherein said n speech recognition modes include: a Navigation mode in which said system performs actions in response to spoken commands, a Conversation mode in which said system interacts audibly with a speaking user, said system, while so interacting, producing audible speech representing responses of a virtual assistant to spoken inquiries made by said user, and a Dictation mode in which said system converts user speech into corresponding displayed strings of text; and wherein each said cue reflecting a said instantaneous speech recognition mode of operation includes an icon pictorially representing the respective mode of operation.

15. A computer program product in accordance with claim 14 wherein said cues reflecting said speech recognition modes include displayed strings of alphanumeric characters and words representing speech recognized by said system, either correctly or incorrectly, as having just been spoken into said microphone.

* * * * *